(12) United States Patent
Leventis et al.

(10) Patent No.: US 8,394,492 B1
(45) Date of Patent: Mar. 12, 2013

(54) SURFACE MODIFIED AEROGEL MONOLITHS

(75) Inventors: Nicholas Leventis, Westlake, OH (US); James C. Johnston, Euclid, OH (US); Maria A. Kuczmarski, Independence, OH (US); Mary Ann B. Meador, Strongsville, OH (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 2337 days.

(21) Appl. No.: 10/974,991

(22) Filed: Oct. 28, 2004

(51) Int. Cl.
*B32B 27/38* (2006.01)
*B32B 27/40* (2006.01)
*B32B 27/42* (2006.01)
*B05D 7/24* (2006.01)

(52) U.S. Cl. .............. 428/319.3; 428/375; 428/307.3; 427/385.5; 427/386

(58) Field of Classification Search .......... 428/375; 528/179, 185
See application file for complete search history.

(56) References Cited

U.S. PATENT DOCUMENTS

| | | | | |
|---|---|---|---|---|
| 5,084,544 A | * | 1/1992 | Muller et al. | 528/73 |
| 5,614,606 A | * | 3/1997 | Chaudhari et al. | 528/353 |
| 5,681,967 A | * | 10/1997 | Hergenrother et al. | 549/243 |
| 5,830,387 A | * | 11/1998 | Yokogawa et al. | 252/62 |
| 6,080,475 A | * | 6/2000 | Frank et al. | 428/331 |
| 6,528,153 B1 | * | 3/2003 | Benzing et al. | 428/307.3 |
| 2001/0055797 A1 | * | 12/2001 | Conroy et al. | 435/177 |
| 2002/0025427 A1 | * | 2/2002 | Schwertfeger et al. | 428/331 |

OTHER PUBLICATIONS

Hotaling, S.P. Ultra-low density aerogel optical applications. J. Mater. Res., vol. 8, No. 2, Feb. 1993, p. 352-355.*
Husing et al. Aerogels-Airy Materials: Chemistry, Structure, and Properties. Angew. Chem. Int. Ed., 1998, 37, p. 23-45.*
Meyer et al. "Synthesis and Characterizatin of Polyimides Endcapped with Phenylethynylphthalic Anhydride". (1995). vol. 33, pp. 2141-2149.*
Yuan et al. Preparation of Functional Silica Aerogels Using Ionic Liquids as Solvents. American Chemical Society, Published Jul. 25, 2002. Chapter 8, pp. 106-113.*
Nano Letters 2002 vol. 2, No. 9 p. 957-960 "Nanoengineering Strong Silica Aerogels" by: Dr. N. Leventis et. al.

* cited by examiner

*Primary Examiner* — Maria Veronica Ewald
*Assistant Examiner* — Prashant J Khatri
(74) *Attorney, Agent, or Firm* — James V. Tura; Robert H. Earp, III

(57) ABSTRACT

This invention comprises reinforced aerogel monoliths such as silica aerogels having a polymer coating on its outer geometric surface boundary, and to the method of preparing said aerogel monoliths. The polymer coatings on the aerogel monoliths are derived from polymer precursors selected from the group consisting of isocyanates as a precursor, precursors of epoxies, and precursors of polyimides. The coated aerogel monoliths can be modified further by encapsulating the aerogel with the polymer precursor reinforced with fibers such as carbon or glass fibers to obtain mechanically reinforced composite encapsulated aerogel monoliths.

25 Claims, 3 Drawing Sheets

(a)
AEROGEL MONOLITH
BEFORE COATING (b)
AEROGEL MONOLITH
AFTER COATING

FIG-1

SURFACE MODIFIED AEROGEL MONOLITHS

ORIGIN OF INVENTION

The invention described herein was made by employees of the United States Government and may be manufactured and used by or for the Government for governmental purposes without the payment of any royalties thereon or therefor.

FIELD OF THE INVENTION

This invention relates to surface modified, reinforced aerogels and to a method of mechanically reinforcing aerogels such as silica aerogel by cross-linking with a polymer the individual nanoparticles that comprise the structural framework of aerogel monoliths. In those materials, the addition of the polymer is directed chemically by templated growth to the internal surfaces of the aerogel monolith, and the new or coated aerogel retains the mesoporosity of the native aerogel practically intact. The modified aerogel is about three (3) times more dense than the underlying native aerogel skeleton and about 300 times stronger. For example, in a typical three-point bent test configuration, a typical aerogel monolith ~1 cm in diameter and ~4 cm long breaks with ~100 g worth of force, but a crosslinked monolith of the same dimensions breaks with over 100 times that force.

BACKGROUND OF THE INVENTION

Aerogels are one of the lowest-density solid materials in existence and are made up of a nanoporous network of particles. Although their thermal conductivity can be lower than that of air, silica aerogels are very brittle, difficult to handle, and tend to absorb moisture. The latter compromises the strength indirectly by facilitating propagation of fractures. Therefore, practical use of these aerogels has been limited to specialized environments such as in nuclear reactors as the Cherencov radiation detectors or in space for collection of hypervelocity particles or for thermal insulation in space vehicles like the Sojourner Rover on Mars (1997). Although monolithic aerogels are desirable, currently, only aerogel beads are commercially available in large quantities, but beads suffer from severe settling problems due to their fragility. Monolithic aerogels are known in the art and can be prepared, for example, by various methods including the method disclosed in U.S. Pat. No. 4,432,956.

Aerogels are attractive materials for a variety of thermal insulation applications, however, this application has been slow because aerogels are fragile and difficult to handle. Therefore, it is desirable to encapsulate or coat aerogel monoliths with a harder skin or coating which does not compromise the bulk properties of the aerogel, but makes it easy to handle, transport and make into desirable products. The encapsulation may be in the form of a metal or ceramic coating. However, in cases where metals are undesirable due to corrosion or where the cost or difficulty in applying the ceramic coatings are prohibitive, a paint-on or spray-on coating of polymers precursors may be used. It is well known that aerogels collapse in contact with liquids, so that this method has not been attempted. In the present invention, we have found that we can coat aerogel monoliths by methods using viscous polymer precursors and subsequently curing the precursors into hard coatings without collapse of the monoliths. This is achieved by (a) controlling the amount of the coating precursor and/or (b) by curing the precursor coating to a hard layer before the monomeric or oligomeric precursor has time to percolate into the aerogel bulk. These principles have been demonstrated, for example, with isocyanates as the precursor which are cured by exposure to moisture in the environment to provide polyurethane/polyurea coatings. The same principles can be applied to other precursors such as the precursors of epoxies or polyimide precursors to obtain high temperature resistant protective layers or perfluorinated coatings for increased strength in combination with hydrophobicity or in combination with composite materials such as fibers to create aerogels encapsulated in a high strength shell.

SUMMARY OF THE INVENTION

The unique and novel feature of the present invention is that this invention provides mechanically robust aerogel monoliths with no alteration of the aerogels bulk properties which include low density, high porosity, high surface area, low dielectric constant and low thermal conductivity. The surface hardener or prepolymer coating is applied quickly on the outer geometric surface boundary of the monolith and conveniently by methods that can be as simple as painting or spraying the aerogel monolith. One may employ a variety of polymer precursors or prepolymers and curing schemes. For example, one may use heat curable precursors of epoxies, an air curable isocyanate which is a precursor of polyurethane, polyimide precursors, or a UV-curable resin. The urethane or epoxy coatings render aerogel monoliths water repellent and also increase the aerogels environmental stability.

More specifically, the reinforced aerogel monoliths of this invention are prepared by coating the aerogel with effective amounts of a polymer precursor selected from the group consisting of precured isocyanates, precursors of epoxies, and anhydride-terminated polyamic acids or polyimide precursors. The coated aerogel monoliths such as silica aerogel are subsequently cured at ambient temperatures and above e.g. temperatures ranging from ambient up to about 300° C. or higher depending on the particular polymer precursor to obtain a skin or surface modified reinforced silica aerogels having a density of about $0.2/cm^3$. The aerogel monoliths of this invention can be modified further by using effective amounts of polymer matrix composites comprising precursors of epoxies, precursors of polyimides and isocyanates i.e. a precursor for polyurethane/polyurea reinforced with various fibers such as carbon, glass, quartz or boron fibers and other filler materials.

Accordingly, it is an object of this invention to provide aerogel monoliths with a reinforced hard coating on the outer geometric surface boundary of the aerogel monolith making the aerogel easy to handle without compromising the aerogel's bulk density properties.

It is another object of this invention to render and provide aerogel monoliths mechanically robust with no alteration of the aerogel's bulk composition or properties including the aerogel's low density, high porosity, high surface area, low dielectric constant, and low thermal conductivity.

It is another object of this invention to provide aerogel monoliths encapsulated with polymer matrix composites comprising precursors of polyimides, precursors of epoxies, and isocyanates as precursors for polyurethane/polyurea reinforced with fibers.

It is still a further object of this invention to provide methods of preparing reinforced aerogel monoliths by coating the aerogel monoliths with effective amounts of a polymer precursor and subsequently curing the precursor to form the polymer coating.

BRIEF DESCRIPTION OF THE DRAWINGS

FIG. 1 shows an aerogel monolith before and after the aerogel was coated with an isocyanate and subsequently cured.

The foregoing and other objects of this invention will become better understood with reference to the following description.

DETAILED DESCRIPTION OF THE INVENTION

This invention relates to outer surface modified or reinforced aerogel monoliths and to the method of preparing said aerogel monoliths which comprises coating the aerogel monolith with effective amounts of polymer precursors selected from the group consisting of isocyanates as a precursor, precursors of epoxies, such as uncured epoxides i.e. liquid epoxie glue components, and precursors of polyimides i.e. polyamic acids with anhydride endcaps. The precursor coating on the outer geometric surface boundary of the aerogel monoliths are subsequently cured at ambient or room temperature and higher e.g. temperature ranging from ambient up to about 300° C. and above to obtain surface modified aerogel monoliths that are mechanically robust with no alteration or change in the bulk composition of the aerogel.

Example 1

Skin Reinforced Native Silica Aerogels with Isocyanate

A commercially available silica aerogel monolith 2"×2"× 0.5" was manually coated with isocyanates comprising a commercially available viscous mixture of di- and poly-isocyanates (Desmodour N3200A supplied by Bayer Corp.) including the following:

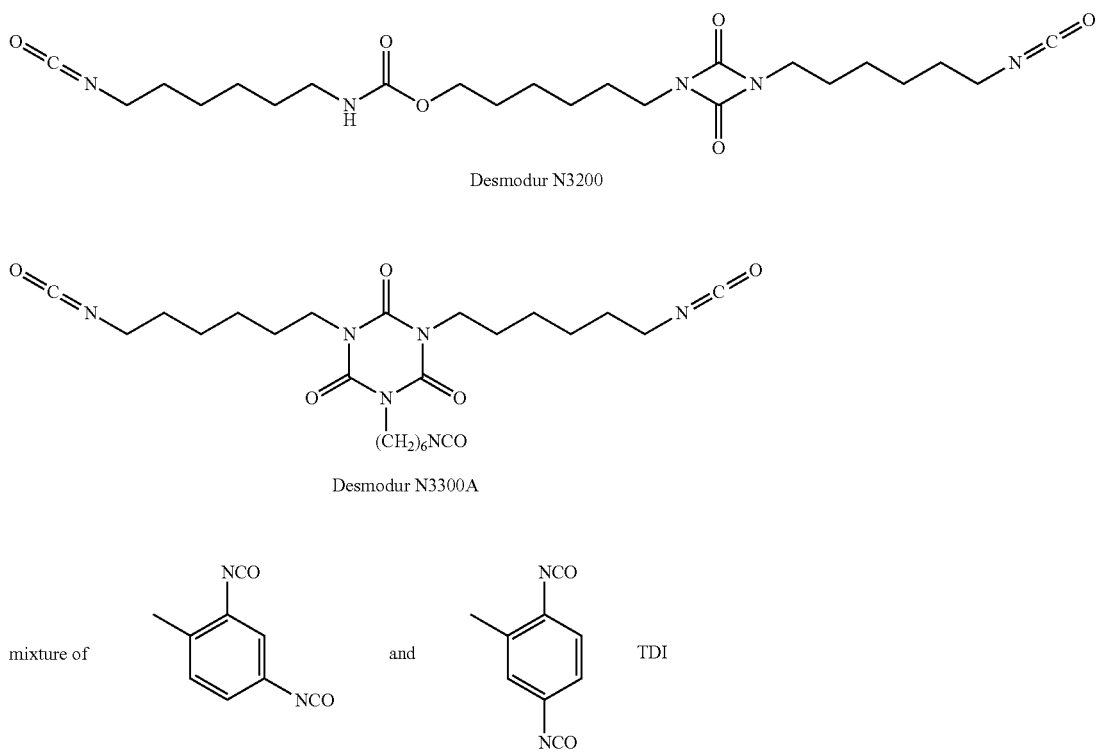

A second layer of isocyanates was applied 12 hours later, and the monolith was left in the open air under ambient conditions to cure. Curing involves: (a) reaction of one of the isocyanate groups with the hydroxyl groups (—OH) on the surface of silica and (b) reaction of the free isocyanate group with moisture from the air. This reaction of the diisocyanate with water leads to hydrolysis to an amine liberating carbon dioxide ($CO_2$). The newly formed amine reacts with more isocyanate to form a hard polymer coating of polyurea on the aerogel monolith. FIG. 1 shows the aerogel monolith before and after it was coated with the isocyanate and cured. The skin reinforced monolith appears white and can be handled, accentually dropped or transported without damage.

The following is an illustration of the reaction of an aerogel with an isocyanate as the precursor to form a coating on the outer geometric surface boundary of the aerogel monolith.

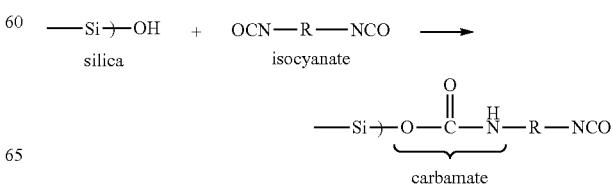

-continued

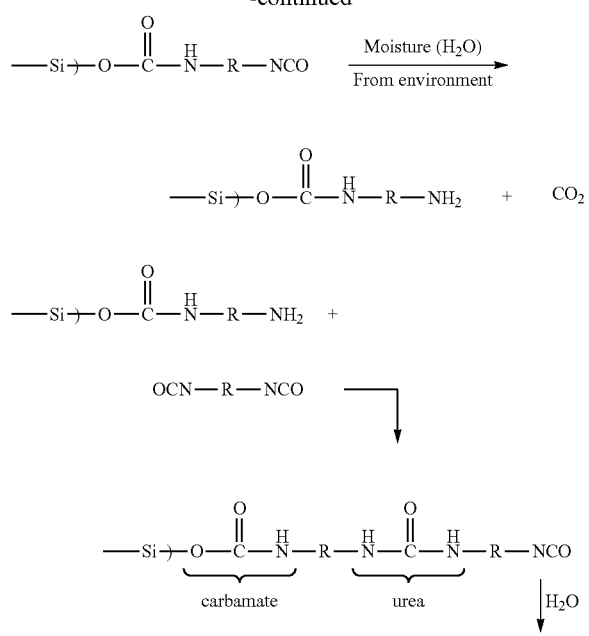

Figure 2:
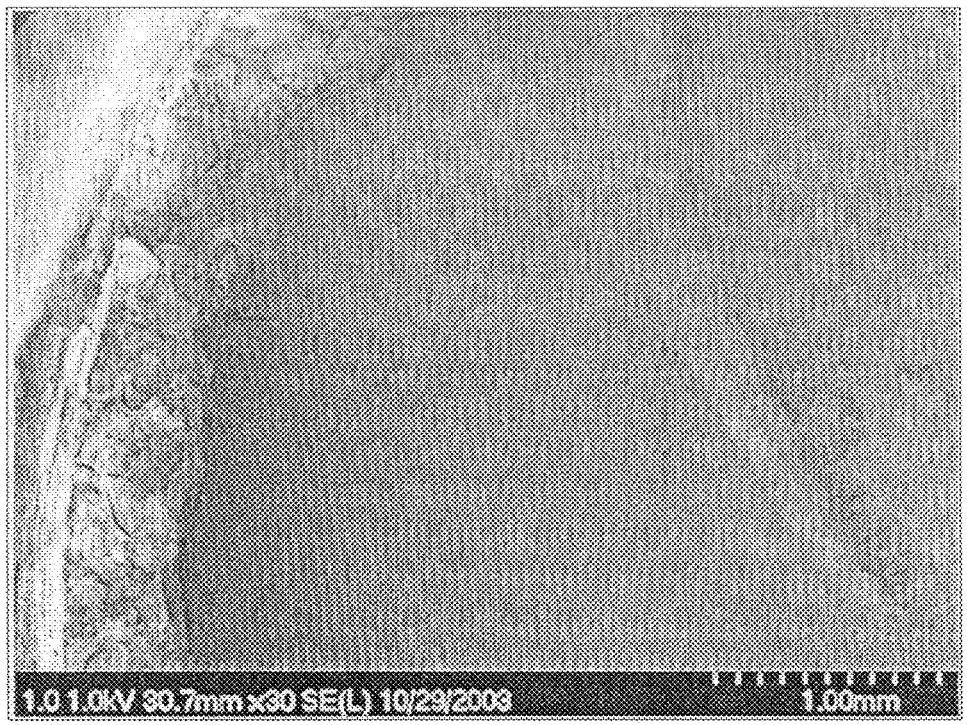
FIG. 2 shows scanning electron microscopy (SEM) at the interface between the aerogel core and the hard skin of similarly treated aerogel cylinders.
Figure 3:
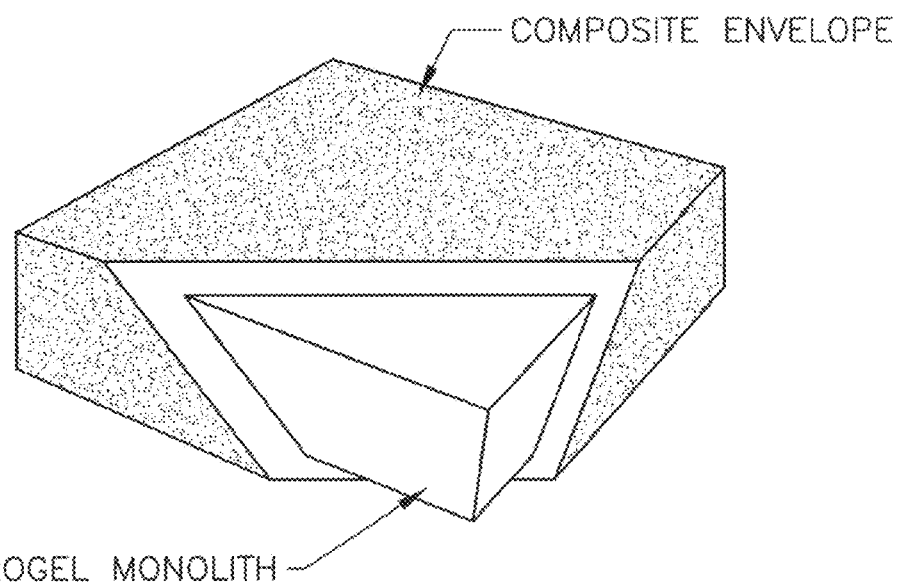
FIG. 3 shows a skin or surface modified aerogel monolith.
Figure 4:
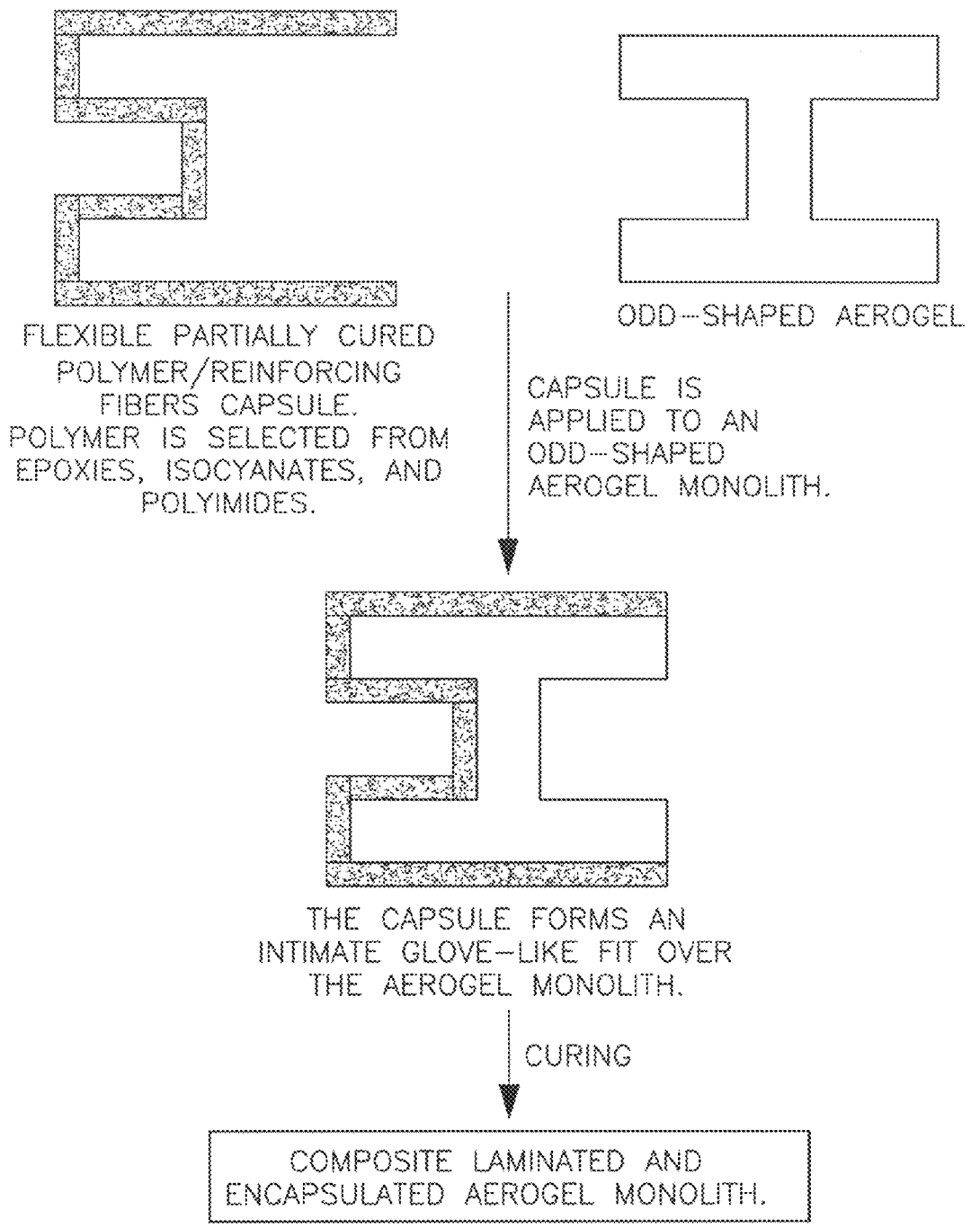
FIG. 4 shows a composite laminated and encapsulated aerogel monolith.

The monolith before the process had a density of 0.1 g/cm³. After the process, the monolith had a density of 0.23 g/cm³ and its volume was reduced from 28.458 cm³ to 27.961 cm³ (a shrinkage of 1.7%), which means that the monolith did not collapse as shown in FIG. 1. Scanning Electron Microscopy (SEM) at the interface between the aerogel core and the hard skin of similarly treated aerogel cylinders reveals a good crack-free contact between the two materials as shown in FIG. 2.

Example 2

Skin Reinforced Native Silica Aerogels with Epoxies

Similar results were obtained by coating the aerogel monolith with a precursor of an epoxie e.g. a liquid precured epoxie glue composition. The two components of the epoxie glue were mixed and heated mildly until a viscous liquid was obtained. That viscous liquid was coated on the surface of cylindrical native silica aerogel samples. Subsequently, the coated samples were placed in an oven at 55° C. until the epoxie precursor coating was completely cured and hardened. The resulting monoliths retained the volume of the original native silica aerogel monolith.

The chemical compatibility and the speed of reaction between the coatings and the aerogel can be improved, if the silica surface contains amines. This is accomplished, for example, by making aerogels by copolymerization of tetramethoxysilane (TMOS: the classic monomer for making sol-gel silica) and an amine-containing silane such as aminopropyltriethoxysilane (APTES). Aerogels made from TMOS/APTES can be coated with polymer precursors including isocyanates, precursors of epoxies, and also with precursors of polyimides as shown in Example No. 3.

Example 3

Skin Reinforced Native Silica Aerogels with Polyimides

A silica aerogel monolith 2"×2"×0.5" made with 25-50% (volume/volume) APTES in TMOS was manually coated on all sides with a viscous THF solution of polyamic acid terminated on either end with a known anhydride such as nadic anhydride. The terminal anhydrides reacted with the amine on the surface of the aerogel. The monolith was allowed to dry overnight and then heated to about 200° C. to cure the polyimide skin as shown by the following reactions:

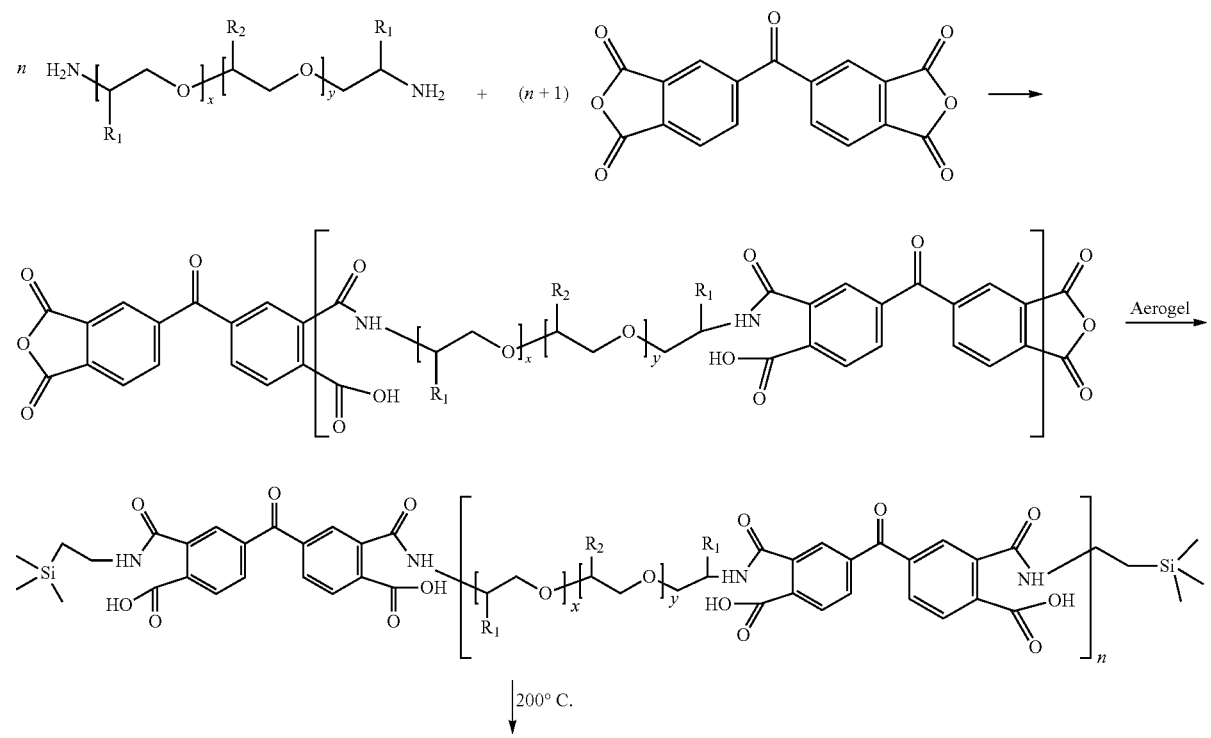

-continued

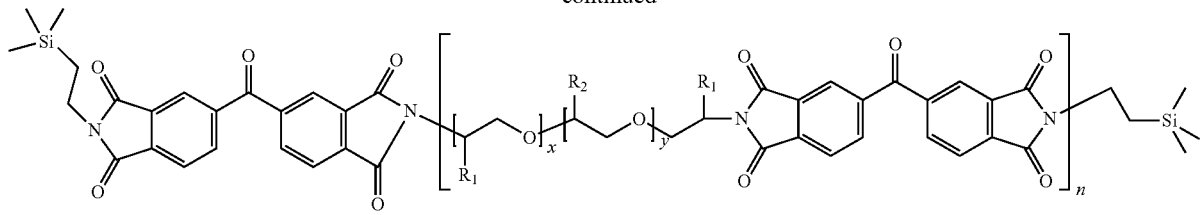

$R_1$ = methyl
$R_2$ = H
x = 5,
y = 39.5
n = 3

In the above equation, $R_1$ is a lower alkyl group such as methyl, $R_2$ is hydrogen, x equals 5.0, y equals 39.5 and n equals 3.0.

Any polyamic-acid terminated with an anhydride will react as long as it is soluble in THF or any other low boiling solvent. Alternatively, any polyamic-acid terminated with an anhydride on one end and a latent reactive endcap on the other such as nadic anhydride as the endcap can be used. Subsequently heating to about 200° C. to imidize the precursor and further heating at 300° C. crosslinks the endcap.

The reinforced aerogel monoliths of this invention can be further modified and reinforced by encapsulating aerogel monoliths with effective amounts of a prepolymer matrix composite, consisting of an epoxie, isocyanate or polyimide precursor reinforced with carbon, glass, quartz or boron fibers and the like and subsequently curing said encapsulated aerogel monoliths to obtain mechanically reinforced composite encapsulated aerogel monoliths. Small but effective amounts of fiber particles such as glass or carbon fibers are added to the polymer precursor to reinforce the polymer coating on the outer geometric surface boundary of the aerogel monolith. The fibers are added to the polymer precursors in amounts ranging from about 0.5 to 60% and preferably in amounts ranging from 0.5 to 10% by weight of the precursors. The particle size of the fibers in the precursors generally range from about nanoparticles to 10 mm and preferably from about nanoparticles to 5.0 mm of size.

For example, the polymer matrix composite consist of a combination of an epoxie precursor comprising a liquid uncured mixture of an epoxide and a hardener coated onto reinforcing fibers. The coated fibers were formed into an appropriate shape to provide an intimate fit over the aerogel monolith and then assembled into a complete capsule, partially cured at a convenient temperature, placed in contact with the aerogel monolith to form a capsule and then cured at a convenient temperature.

In preparing polyimide coatings, the polymer matrix composite consist of a combination of a polyimide precursor comprising a liquid uncured mixture of one or more monoesterified anhydride-terminated mono and dual-functional monomers and a diamine coated onto reinforcing fibers. The coated fibers were placed in contact with the aerogel monolith to form a capsule, and subsequently cured at a convenient temperature.

In another modification, the polymer matrix composite consist of a combination of a polyimide precursor comprising a liquid uncured mixture of one or more anhydride-terminated mono and dual-functional monomers and a diamine coated onto reinforcing fibers. The coated fibers were formed into an appropriate shape to provide an intimate fit over the aerogel monolith and assembled into a complete capsule, partially cured at a convenient temperature, placed in contact with the aerogel monolith to form a capsule, and then cured at a convenient temperature.

In a further modification, the polymer matrix composite consist of a combination of a polyimide precursor comprising a liquid uncured mixture of one or more anhydride-terminated mono and dual-functional monomers and a diamine coated onto reinforcing fibers. The coated fibers were formed into an appropriate shape to provide an intimate fit over the aerogel monolith and assembled into a complete capsule and fully cured at an appropriate temperature. The cured capsule was placed in contact with the aerogel monolith to form a capsule, which was bonded together using an appropriate bonding agent to form the complete capsule.

The process of this invention has solved two primary problems common to aerogels i.e. brittleness and hydrophilicity by applying a hard skin or coating to the geometric configuration or outer boundary of the aerogel monoliths. The aerogel encapsulation allows easy handling and transportation without compromising the bulk properties of the material. The coatings can be achieved by painting or spraying the aerogel monoliths with the appropriate polymer precursors. By controlling the amount of the polymer precursor coating and curing, a hard polymer layer or skin creates a high strength shell without destroying or collapsing the underlying aerogel.

Successful application of a prepolymer coating onto an aerogel monolith depends upon staying within the mechanical limitations of the monolith to prevent mechanical damage due to the coating method. It also requires that the prepolymer be of sufficient viscosity to limit penetration into and collapse of the mesopores. An effective amount of coating of suitable thickness can be applied to the aerogel monolith through the use of a brush. Analogous to brushing, a paint roller can be used manually to apply a coating of the prepolymer onto the monolith. For a continuous process, the monoliths can be made to contact several rollers which can be used to apply the prepolymer to all sides. As long as the prepolymer can be sprayed without delivering excess solvent, spraying provides a uniform coating on the monolith. Aerogel monoliths can be dipped in the prepolymer, either individually or in a continuous method. Coating thickness is controlled by the viscosity of the polymeric precursor using a flexible blade to remove excess thickness. Aerogel monoliths can be encapsulated in reinforced composite shells. Depending on the characteristics of the matrix resin, these composite shells can be placed around the monolith in their uncured state and cured as an assembly or fabricated as precured shells assembled with some bonding agent to form the encapsulated aerogel structure.

The polyimide precursors i.e. the anhydride terminated polyamic acids used to coat and reinforce the silica aerogel monoliths of this invention are well known and include polyimide precursors derived from aromatic dianhydrides, aromatic diamines and reactive crosslinkable monofunctional endcaps. More specifically, the polyimide precursors includes mixtures of lower alkyl di- and/or mono-esters of aromatic dianhydrides, aromatic diamines, and monofunctional endcaps. The end-caps include monofunctional amines, monofunctional anhydrides, and the alkyl monesteracids or alkyl diesters of monofunctional anhydrides wherein the lower alkyl groups have 1 or 2 carbons.

For purpose of preparing the polyimide precursors, some of the preferred dianhydrides include pyromeliticdianhydride (PMDA); 3,3',4,4'-benzophenone tetracarboxylic dianhydride (s-BTDA); 4,4'-(hexafluoroisopropylidene)-bis(phthalic anhydride) (HFDA); 3,3',4,4' biphenyltetracarboxylic dianhydride (BPDA); 2,3,3',4'-benzophenone tetracarboxylicdianhydride(a-BPDA); 4,4'-oxydiphthalic anhydride; 3,3'-oxydiphthalic anhydride; 5'-(1-methylethylidene)bis(1,4-phenyleneoxy)bis-1,3-isobenzofurandione (bisphenol A dianhydride).

Various polyfunctional aromatic amines, including diamines, triamines and tetraamines and mixtures thereof can be used to prepare the polyimide precursors. These polyfunctional amines include diamines, e.g. aromatic diamines containing at least one benzene ring and preferably two benzene rings such as phenylenediamine, 4,4' diamino-diphenylpropane, 4,4'-diamino-diphenylmethane, 4,4'-benzidine, 3,3'-diamino-diphenyl sulfone, 1,5-diamino-naphthalene, bisaniline-m-xylidene (BAX),3,3'-diaminobenzophenone, 3,4'-diaminodiphenylether, 2,2'-dimethylbenzidine, 3,3'-dimethyl benzidine and triamines such as 1,3,5-triaminobenzene, 2,4,6-triamino-s-triazine, 4,4',4'-triaminotriphenylmethane, and 4,4',4'-triaminotriphenylcarbinol.

The preferred crosslinkable end-caps include, for example, 4-phenylethynyl-phthalic anhydride; 4-phenylethynylaniline; p-aminostyrene; endo-cis-bicyclo[2.2.1]-5-heptane-2,3-dicarboxylic anhydride (nadic anhydride); 3 or 4-aminophenylacetylene and various other known amines and monoanhydrides.

The precursors of epoxies include known precured or curable epoxie compositions. For purposes of this invention, the term "precursors of epoxies" includes compounds having one or more oxirane groups, i.e. an oxygen atom bonded to vicinal carbon atoms. Of the various precursors of epoxies available, suitable for purposes of this invention are the precursors that are liquid at room temperature and include, for example, the epoxies derived from bis(parahydroxyphenyl)-dimethylmethane. Other precursors of epoxies having an epoxie equivalent greater than 1.0 are disclosed, for example, in U.S. Pat. Nos. 2,712,000; 2,830,038; and 2,888,439.

More specifically, the precursors of epoxies include compounds which have at least two vicinal epoxie groups which can be characterized either as saturated or unsaturated, aliphatic, cycloaliphatic, aromatic or heterocyclic compounds. The precursors may contain various substituents such as chlorine, hydroxyl groups, or ether radicals. For purposes of characterization, the epoxies are described in terms of their epoxie-equivalents and have an epoxie-equivalent greater than 1.0. The curable epoxie precursors may be prepared in various solvents which include, for example, the organic liquids which escape from the composition by evaporation during the curing step. These solvents include, for example, esters such as butyl acetate, ethyl acetate, acetates of ethylene glycol monoethyl ether (Cellosolve acetate), methyl Cellosolve acetate, and the ethers alcohols such as methyl, ethyl or butyl ether of ethylene glycol or diethylene glycol.

While this invention has been described with some of the preferred embodiments, it will be appreciated that various modifications and variations are within the scope of the appended claims.

The invention claimed is:

1. An aerogel monolith having available reactive sites coated with an effective amount of polymer on its outer geometric surface boundary; said polymer coating derived from polymer precursors selected from the group consisting of precured isocyanates, precursors of epoxies, and precursors of polyimides.

2. The aerogel monolith of claim 1 wherein the aerogel monolith is a silica aerogel monolith.

3. The aerogel monolith of claim 2 wherein the aerogel monolith is derived from the copolymerization of an alkoxysilane and an amino-aryl or an aminoalkylpolyalkoxysilane.

4. The aerogel monolith of claim 1 wherein the polymer precursor is a precured isocyanate.

5. The aerogel monolith of claim 1 wherein the polymer precursor is a precursor of an epoxie.

6. The aerogel monolith of claim 1 wherein the polymer precursor is a precursor of a polyimide.

7. The aerogel monolith of claim 1 wherein the polymer coating is derived from a fiber-reinforced polymer precursor.

8. The aerogel monolith of claim 7 wherein the fiber-reinforced polymer precursor is a fiber-reinforced precured isocyanate.

9. The aerogel monolith of claim 7 wherein the fiber-reinforced polymer precursor is a fiber-reinforced precursor of an epoxie.

10. The aerogel monolith of claim 7 wherein the fiber-reinforced polymer precursor is a fiber-reinforced precursor of a polyimide.

11. The fiber-reinforced polymer precursor of claim 7 wherein the fiber is selected from the group consisting of carbon, glass, quartz, and boron fibers.

12. Method of preparing reinforced aerogel monoliths having available reactive sites which comprises coating aerogel monoliths with effective amounts of a polymer precursor selected from the group consisting of precured isocyanates, precursors of epoxies, and precursors of polyimides and subsequently curing said precursor coated aerogel monoliths to obtain mechanically reinforced polymer coated aerogel monoliths.

13. The method of claim 12 wherein the polymer precursor is a liquid uncured epoxie and a hardener.

14. The method of claim 12 wherein the polymer precursor is a precursor of an anhydride-terminated polyimide.

15. The method of claim 14 wherein the anhydride terminated polyimide is a nadic anhydride terminated polyimide.

16. The method of claim 14 wherein the anhydride of the terminated polyimide is
4-phenylethynylphthalic anhydride.

17. The method of claim 12 wherein the aerogel monolith is a silica aerogel monolith.

18. The method of claim 17 wherein the aerogel monolith is derived from the copolymerization of an alkoxysilane and an amino-aryl or aminoalkylpolyalkoxysilane.

19. The method of claim 12 wherein the polymer precursor is a precured isocyanate.

20. The method of claim 19 wherein the polymer precursor is a mixture of precured isocyanates.

21. The method of claim 12 wherein the aerogel monolith is coated with a precursor of a dianhydride-terminated polyimide.

22. Method of preparing reinforced aerogel monoliths having available reaction sites which comprises coating dry aerogel monoliths with effective amounts of a polymer precursor derived from fiber-reinforced polymer precursors selected from the group consisting of fiber-reinforced precured isocyanates, fiber-reinforced precursors of epoxies, and fiber-reinforced precursors of polyimides.

23. The method of preparing the reinforced aerogel monoliths of claim 22 wherein the fibers in the polymer precursors are selected from the group consisting of carbon fibers, glass fibers, quartz fibers and boron fibers.

24. The method of preparing the reinforced aerogel monoliths of claim 23 wherein the aerogel monolith is silica aerogel monolith.

25. The method of claim 22 wherein the aerogel monolith is derived from the copolymerization of tetramethoxysilane and an amine-containing silane.

* * * * *